(12) United States Patent
Højsted (10) Patent No.: US 7,167,885 B2
(45) Date of Patent: Jan. 23, 2007

(54) EMOD A FAST MODULUS CALCULATION FOR COMPUTER SYSTEMS

(75) Inventor: Erik Højsted, Vanloese (DK)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 10/140,885

(22) Filed: May 9, 2002

(65) Prior Publication Data

US 2003/0182339 A1    Sep. 25, 2003
US 2005/0246406 A9    Nov. 3, 2005

Related U.S. Application Data

(60) Provisional application No. 60/366,242, filed on Mar. 22, 2002, provisional application No. 60/366,245, filed on Mar. 22, 2002.

(51) Int. Cl.
 *G06F 7/38* (2006.01)
(52) U.S. Cl. .................................................. 708/491
(58) Field of Classification Search ................. 708/491
See application file for complete search history.

(56) References Cited

U.S. PATENT DOCUMENTS

| | | | |
|---|---|---|---|
| 4,208,722 A | | 6/1980 | Rasala et al. |
| 4,864,529 A | | 9/1989 | Shah et al. ................ 364/760 |
| 5,008,850 A | | 4/1991 | Jensen ...................... 364/760 |
| 5,373,560 A | * | 12/1994 | Schlafly .................... 380/30 |
| 5,402,369 A | | 3/1995 | Main ........................ 364/757 |
| 5,644,695 A | * | 7/1997 | Blaum et al. ................ 714/6 |
| 2002/0154768 A1 | * | 10/2002 | Lenstra ..................... 380/30 |
| 2004/0010530 A1 | * | 1/2004 | Freking et al. ............. 708/491 |

FOREIGN PATENT DOCUMENTS

| | | |
|---|---|---|
| EP | 0 326 414 | 8/1989 |
| EP | 0 744 688 | 11/1996 |
| WO | WO 01/25899 | 4/2001 |

OTHER PUBLICATIONS

Walter, Colin D., "Faster Modular Multiplication by Operand Scaling", Computation Department, pp. 1-9, U.M.I.S.T., Manchester, England.
Patent Abstracts of Japan, vol. 1999, No. 08, Jun. 30, 1999, & JP 11 066045 (OKI Electric Ind Co Ltd), Mar. 9, 1999.

* cited by examiner

*Primary Examiner*—Tan V. Mai
(74) *Attorney, Agent, or Firm*—Grossman, Tucker, Perreault & Pfleger, PLLC (57) ABSTRACT

An emod operation is a computational substitute for a traditional modulus operation, one that is computationally less expensive but also less precise. Where a modulus operation may be defined for some base number n, the emod operation determines a modulus of an operand using a "phantom modulus," one that is an integer multiple of n. The phantom modulus is chosen to make emod calculations computationally inexpensive when compared to a modulus operation. Thus, the emod operation is particularly useful for multiplications or exponential operations using very large operands. Upon conclusion of interstitial processing associated with the multiplications or exponential operations, a single, traditional modulus operation may be used to obtain a final result.

28 Claims, 5 Drawing Sheets

MULTIPLIER B  FIG. 6

EMOD A FAST MODULUS CALCULATION FOR COMPUTER SYSTEMS

CROSS-REFERENCE TO RELATED APPLICATION

This application claims the benefit of priority afforded by Provisional Application Ser. No. 60/366,242, filed Mar. 22, 2002; and Provisional Application Ser. No. 60/366,245, filed Mar. 22, 2002.

BACKGROUND

The present invention relates to modulus calculations. In particular, it relates to modulus calculations that may be performed with high degrees of efficiency.

A modulus calculation (colloquially, a "mod" calculation) determines the remainder of a division operation. Thus, the expression A mod N determines a result that is the remainder obtained by dividing the number A by N. Example: 17 divided by 3 is 5 with a remainder of 2. "17 mod 3" yields a result having value 2.

Mod calculations are performed in many computing applications including key negotiation conducted between two parties before engaging in encrypted communication. In the key negotiation context, evaluation of equations having the form ($A^B$) mod n is performed at two terminals. Often, the A and B values may be quite large—from 1024 to 2048 bits long. Of course, when two operands having length l are multiplied, the result may have a length of up to 2l. With such large operands, it is impractical to build result registers in a processor that have the full width of the multiplication result. Instead, as multiplication results are generated, they typically are truncated by applying the mod calculation to each product. Because the mod calculation divides each product by a modulus having its own length (say, j), the result always has a length less than j.

Assuming operands of length l and an equal number of 0s and 1s therein, evaluation of $A^B$ mod n may require l multiplications and l mod operations. This involves considerable computational expense. The expense associated with such computations becomes particularly severe in high-load environments such as computer servers where it can be expected that several thousand key negotiation requests (maybe more) would be received per hour.

Accordingly, there is a need in the art for a fast, computationally inexpensive technique for resolving mod operations with large operands.

DETAILED DESCRIPTION

Embodiments of the present invention introduce an "emod" operation for use in mod calculations. The emod is a computational substitute for a traditional mod operation, one that is computationally less expensive but also less precise. The emod operation may be used in connection with interstitial multiplications that may be generated during evaluation of an $A^B$ mod n calculation or an (A·B) mod n calculation. At the end, when a final product is available, a traditional mod operation may be performed to obtain a final result. In this way, the embodiments of the present invention avoid the computational expense of perhaps thousands of mod operations that might otherwise be performed at interstitial stages of operation.

Although computers perform arithmetic operations having binary values (base 2), the advantages of the emod operation might best be understood with an example using traditional decimal numbers (base 10). To evaluate the operation 23754 mod 3331, it would be conventional to divide 23754 by the modulus 3331 to obtain the remainder 437. However, such division is computationally expensive. It would be far easier to use some multiple of the modulus that is closer to $10^k$ for some arbitrary number k. Using such a multiplier (say 9993 instead of 3331), one may employ a series of subtractions instead of a division operation. After twice subtracting 9993 from 23754, one is left with a residual of 3768 (which includes the correct remainder 437 plus 3331). This residual is sufficient for use with the interstitial products obtained at intermediate stage of computation. When a final result is obtained and a true mod operation is employed, the correct remainder will be isolated from any multiples of the modulus that may have been carried over from the intermediate stages. Use of this "phantom modulus," however, improves processing speed.

The example illustrated above also works in a binary scheme. In the base 2 domain, for some modulus n, a multiple is chosen that closely approximates some $2^k$ for some arbitrary k. Just as the decimal example above included a consecutive series of 9s in the most significant bit positions, in the binary example, the phantom modulus will include a consecutive series of 1s in the most significant bit positions. This property simplifies the subtraction that takes place when reducing the operand A by the phantom modulus.

Given a modulus n, a phantom modulus mn may be chosen such that m·n=$2^k$−d, where d<n. Then the emod operation may be employed as a recursive subtraction in which mn is subtracted from the source operand until the residual is less than mn. These two parameters, d and m, control the emod operation.

Evaluation of (A·B) emod n

According to an embodiment, evaluation of:

$$c=(A \cdot B) emod\ n \qquad (1)$$

may be performed by parsing the operand B into multiple words of w bits each. Thus:

$$B = B[M-1], B[M-2], \ldots, B[0] = \sum_{i=0}^{M-1} 2^{w \cdot i} B[i] \qquad (2)$$

Equation 1, then becomes:

$$c = \left(A \cdot \sum_{i=0}^{M-1} 2^{w \cdot i} B[i]\right) \text{emod} n = \quad (3)$$

$$((\ldots (A \cdot B[M-1] \cdot 2^w + A \cdot B[M-2]) \cdot 2^w + \ldots) \cdot 2^w + A \cdot B[0])$$

$$\text{emod} n$$

The emod operation is distributive and may be replicated within the parenthetical. This property leads to the method illustrated in FIG. 1.

Figure 1:
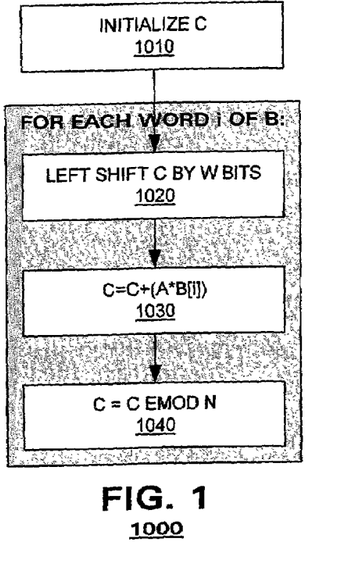
FIG. 1 illustrates a method according to an embodiment of the present invention.

FIG. 1 illustrates a method 1000 according to an embodiment of the present invention. According to the method 1000, a variable c may be initialized to be zero (box 1010). Thereafter, the method 1000 iteratively may consider each word of the multiplicand B, starting with the word corresponding to the most significant bit position of B and working toward the word corresponding to the least significant bit position. During each iteration, the method 1000 may shift left the c value from a prior iteration by the length of a word (box 1020). The value of A multiplied by the new B word (labeled, "B[i]") may be added to the shifted value of c (box 1030). Thereafter, the emod operation may be performed on the result obtained from box 1030 (box 1040). The result of the emod may be used as the initial value c of a subsequent iteration. Following the last iteration, the c value obtained is the result of the calculation.

In one embodiment, the method of FIG. 1 may be implemented in software according to the following pseudocode.

---
The Basic Multiply/Modulo algorithm

```
c := 0
for i := (M-1) downto 0 do
    c := (a · b[i] + shiftleft (w,c)) emod n
```
---

Where shiftleft(w,c) merely shifts left the c operand by w bits. This is equivalent to a multiplication by $2^w$ in binary.

The emod operator operates based on a phantom modulus mn=m·n, yielding a precision factor $d=2^k-mn$. If the operand c were split into two parts, a quotient q and a remainder r, so that:

$$c = q \cdot 2^k + r \quad (4)$$

then the emod operation may be defined as:

$$(c \text{ emod} n) = ((q \cdot 2^k + r) \text{emod} n) \quad (5)$$

$$= (q \cdot 2^k + r - q \cdot mn)$$

$$= (r + q \cdot d).$$

Figure 2:
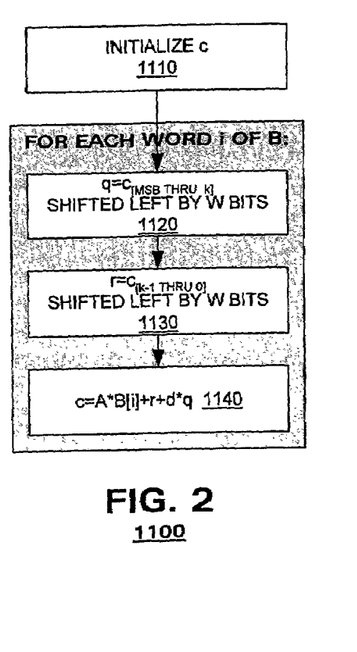
FIG. 2 illustrates a method according to an embodiment of the present invention.

This emod function may be integrated into the method of FIG. 1 as shown in the embodiment of FIG. 2.

FIG. 2 illustrates a method 1100 according to an embodiment of the present invention. According to the method 1100, a dummy variable c may be initialized to be zero (box 1110). Thereafter, the method iteratively may consider each word of the multiplicand B, starting with the word corresponding to the most significant bit position of B and working toward the word corresponding to the least significant bit position. The method may calculate a quotient value q and a remainder value r from the value c obtained from a prior iteration (boxes 1120, 1130). The quotient q may be taken as a span of bits from c extending from the most significant bit position to the $k^{th}$ bit position, shifted left by w bits. The remainder r may be taken as the remaining bits of c, extending from the $k-1^{th}$ bit position to the $0^{th}$ bit position, shifted left by w bits. Thereafter, the c value may be evaluated as:

$$c = A \cdot B[i] + r + d \cdot q \quad (6)$$

(box 1140). The c value obtained at the last iteration may be taken as the result of the emod function.

In one embodiment, the method of FIG. 2 may be implemented in software according to the following pseudocode.

---
A Multiply/Modulo algorithm

```
c := 0
for i := (M-1) downto 0 do
    q := selectbits (max_bits downto k, c)
    r := selectbits ((k-1) downto 0, c)
    c := a · b[i] + shiftleft (w, r) + shiftleft (w, d · q)
```
---

This implementation requires that the product d·q is available immediately. In practice, since this product may take some time to generate, the method effectively becomes stalled until the product becomes available.

Figure 3:
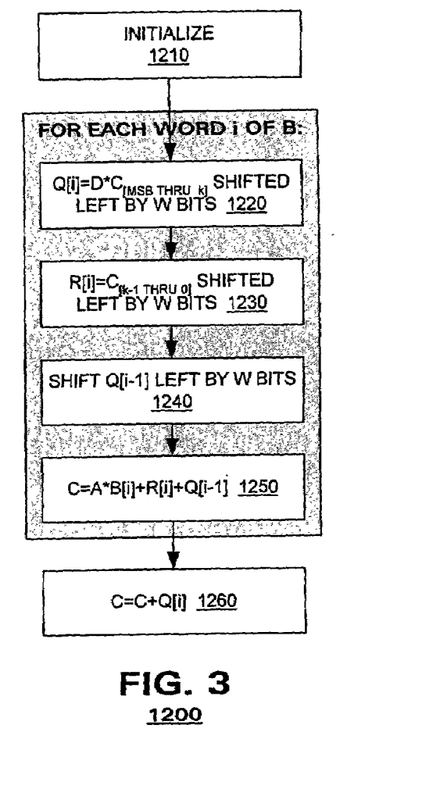
FIG. 3 illustrates another method according to an embodiment of the present invention.

In an alternate embodiment, the method may complete a current iteration without having the d·q product available. Instead, it may advance to the next iteration of i and integrate the d·q product from a previous iteration. FIG. 3 illustrates this embodiment.

FIG. 3 illustrates a method 1200 according to an embodiment of the present invention. According to the method 1200, a variable c may be initialized to be zero (box 1210). Thereafter, the method iteratively may consider each word of the multiplicand B, starting with the word corresponding to the most significant bit position of B and working to the word corresponding to the least significant bit position. At each iteration, the method 1200 may calculate a quotient value q[i] and a remainder value r[i] from the value c obtained from a prior iteration (boxes 1120, 1130). The quotient q[i] may be taken as a span of bits from c extending from the most significant bit position to the $k^{th}$ bit position, shifted left by w bits. The remainder r[i] may be taken as the remaining bits of c, extending from the $k-1^{th}$ bit position to the least significant bit position, shifted left by w bits. The quotient q[i-1], obtained from a prior iteration, also may be shifted left by w bits (box 1240). Thereafter, the c value may be evaluated as:

$$c = A \cdot B[i] + r[i] + d \cdot q[i-1], \quad (7)$$

where the q[i-1] value is the shifted value obtained in box 1240 (box 1250).

Following the final iteration, the quotient from the final iteration may be added to c (box 1260). The value obtained from this operation may be taken as the result from the emod operation.

In one embodiment, the method of FIG. 3 may be implemented in software according to the following pseudocode.

| The Multiply/Modulo algorithm with one cycle q-delay |
|---|
| c := 0 |
| for i := (M−1) downto 0 do |
|     q1 := q |
|     q := selectbits (max_bits downto k, c) |
|     r := selectbits ((k−1) downto 0, c) |
|     c := a · b[i] + shiftleft (w, r) + shiftleft (2·w, d · q1) |
| q1 := q |
| c := shiftleft (w, c) + shiftleft (2·w, d · q1) |
| c := shiftright (w, c) |

In this embodiment, the d·q product from a prior iteration (relabeled as d·q1) is shifted left to account for positional differences between the two words.

As noted above, the embodiment of FIG. 3 need not be stalled while waiting for evaluation of a d·q operation. This embodiment may find application in a high-load application where avoidance of computational latencies may be at a premium.

Multiplication of Large Numbers with Small Numbers

As described above, the multiplicand B may be parsed into a plurality of smaller words B[w], w=0 to M−1, and the words may be used as a basis on which to perform the multiplication with the multiplier A. A discussion of a circuit implementation for this embodiment follows.

Figure 4:
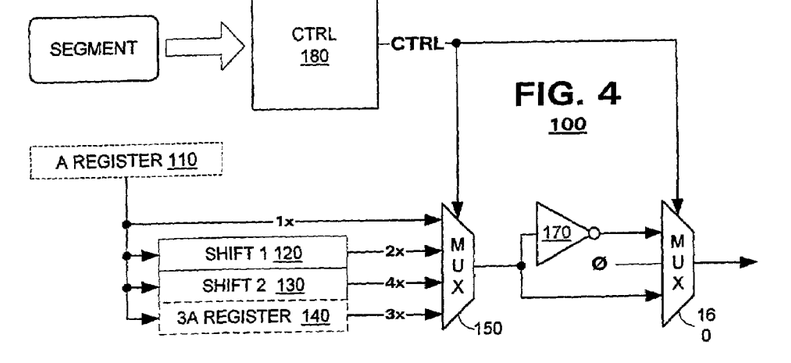
FIG. 4 is a block diagram illustrating an interstitial product generator according to an embodiment of the present invention.

FIG. 4 is a block diagram illustrating an interstitial product generator ("IPG") 100 according to an embodiment of the present invention. The IPG 100 generates an interstitial product from a multiplicand A. It may include a multiplicand register (called, an "A register" herein) 110, a pair of shifters 120, 130 (labeled "shift 1" and "shift 2 respectively) and a "3A register" 140. The A and 3A registers are illustrated in phantom because they may (but need not) be placed within the IPG 100 itself; alternatively, they may be provided in some other circuit but their contents may be provided as an input to the IPG 100. The IPG 100 also may include a pair of multiplexers (colloquially, "MUXes") 150, 160 and an inverter 170.

The shifters 120, 130 each present values representing the value stored in the A register shifted by a predetermined number of bit positions. The first shifter 120 may present an A value shifted one bit position toward the most significant bit position. It is labeled "shift 1." The second shifter 130 may present the A value having been shifted two bit positions toward the most significant bit position, labeled "shift 2." In binary data systems, a single or double bit shift causes a two-fold or four-fold multiplication of a source data value respectively.

The shifters 120, 130 may be provided as any number of embodiments. Perhaps the simplest embodiment is to provide a shifter as a wired interconnection between the A register 110 and the MUX 150. For example, each bit position i in the A register 110 may be connected to a position i+1 of the MUX 150 to constitute the "shift 1" shifter 120. Similarly, each bit position i in the A register may be connected to a position i+2 of the MUX 150 to satisfy the "shift 2" shifter 130. The least significant bit position of the shift 1 shifter may be grounded. The two least significant bit position of the shift 2 shift inputs to the MUX 150 also may be grounded. This architecture provides the desired shift functions with the least implementation cost in terms of area or control hierarchy.

Alternatively, the shifters 120, 130 could be provisioned as formal shift registers complete with storage cells (not shown) for storage of shifted values. Although there is no performance advantage for this alternative, it may find use in applications where such shift registers are employed for other purposes.

The 3A register 140, as its name implies, is a register to store a value representing three times the value in the A register. The values stored in this register may be obtain from a straightforward addition of the values from the A register 110 and the shift 1 register 120 or, alternatively, from a subtraction of the values in the shift 1 register 120 from the value in the shift 2 register 140. Circuitry to implement these functions is straightforward and omitted from the illustration of FIG. 1 to keep the illustration simple. In an embodiment, the 3A register 140 also may be provided in a location external to the IPG 100; it is illustrated in phantom accordingly.

Outputs from the A register 110, the two shifters 120 and 130 and the 3A register 140 may be input to the first MUX 150. An output from the first MUX 150 may be input to both the second MUX 160 and the inverter 170. An output from the inverter 170 may be provided as a second input to the second MUX 160. The inverter 170 may generate a two's complement inversion of the multibit output from the first MUX 150. The second MUX 160 may have a third input coupled directly to a zero value "0." Alternatively, the zero value could be input to the first MUX 150. Thus, given an input value A, the IPG 100 may generate any of the following outputs: A, $\overline{A}$, 2A, $\overline{2A}$, 3A, $\overline{3A}$, 4A, $\overline{4A}$ and 0.

The IPG 100 may include a controller 180 that governs operation of the two MUXes 150, 160. As discussed below, given an input "segment," the controller 180 may generate a control signal (labeled $c_i$) that causes the MUXes 150, 160 to output a selected one of the possible outputs on each cycle of a driving clock (not shown).

Figure 5:
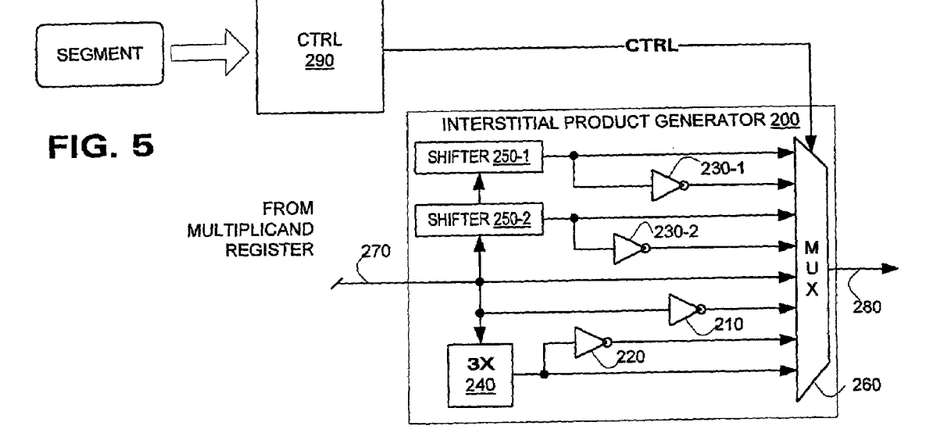
FIG. 5 is a block diagram illustrating an IPG according to an alternate embodiment of the present invention.

FIG. 5 is a block diagram illustrating an IPG 200 according to an alternate embodiment of the present invention. According to an embodiment, the IPG 200 may include a plurality of inverters 210, 220, 230-1, 230-2, a 3× multiplier 240, a pair of shifters 250-1, 250-2 and a multiplexer 260. In this embodiment, the IPG 200 is illustrated as connected to an external multiplicand register rather than including the multiplicand register as part of it. The multiplicand may be input to the IPG 200 on a first terminal 270 thereof. One of the inverters 210 may be coupled to the first terminal 270, to invert a multiplicand when presented.

The 3× multiplier, as its name implies, may generate a value that is three times a multiplicand when presented at the input terminal. A second inverter 220 may be coupled to the 3× multiplier 240 to invert the output thereof.

The shifters 250-1, 250-2 provided shifted versions of the multiplicand as in the embodiment of FIG. 2. One of them (say, shifter 250-1) shifts the input multiplicand by a single bit position; the other 250-2 shifts the multiplicand by two bit positions. Inverters 230-1, 230-2 from the respective shifters 250-1, 250-2 may generated inverted shifted values of the multiplicand. The shifters 250-1, 250-2 may be provided according to any of the embodiments described above.

Outputs from the inverters 210, 220, 230-1, 230-1, the 3× multiplier 240 and the shifters 250-1, 250-2 may be input to the multiplexer 260. The multiplexer 260 also may be controlled to output none of the inputs from the IPG 200. In this condition, the multiplexer 260 causes the IPG 200 to generate a zero output therefrom.

According to an embodiment, when it is desired to perform a multiplication based on a long multiplicand A and a shorter multiplier B, the multiplicand A may be input to the IPG 200. Values of A, 3A, $\overline{A}$ and $\overline{3A}$ will be available to the multiplexer 260 after a short initialization period. Similarly, shifted values of A and $\overline{A}$ also will be available to the multiplexer 260. Once these values are available, they may be retrieved from the IPG and forwarded to a remainder of a multiplication circuit (not shown in FIG. 5) based on values of multiplier segments.

The IPG may include a controller 290 responsive to these multiplier segments to cause the multiplexer 260 to retrieve one of the previously stored values from within the IPG. As is known, many multiplication circuits include controllers for other purposes. The controller 290 may be integrated into these known controllers or may be provided as a separate element as may be desired. FIG. 5 illustrates the controller 290 as being separate from the IPG 200 for convenience only.

In an embodiment, the multiplier B may be parsed into several four bit segments $s_i$. Each segment $s_i$ includes the bits $B_{3i+2}$–$B_{3i-1}$ from the multiplier B. From these segments, a control signal CTRL may be generated to determine which value from within the IPG should be output from the multiplexer. In an embodiment, the IPG may generate outputs according to the scheme shown in Table 1 below.

TABLE 1

| Input Pattern of Segment $s_i$ | CTRL | Interstitial Product |
| --- | --- | --- |
| 0000 | 0 | 0 |
| 0001 | 1 | A |
| 0010 | 1 | A |
| 0011 | 2 | A<<1 |
| 0100 | 2 | A<<1 |
| 0101 | 3 | 3A |
| 0110 | 3 | 3A |
| 0111 | 4 | A<<2 |
| 1000 | −4 | $\overline{A<<2}$ |
| 1001 | −3 | $\overline{3A}$ |
| 1010 | −3 | $\overline{3A}$ |
| 1011 | −2 | $\overline{A<<1}$ |
| 1100 | −2 | $\overline{A<<1}$ |
| 1101 | −1 | $\overline{A}$ |
| 1110 | −1 | $\overline{A}$ |
| 1111 | 0 | 0 |

Where $\overline{A}$ is the two's complement of an input A. The control value CTRL may be related to the four bits input pattern by:

$$CTRL = -4s_{i3} + 2s_{i2} + s_{i1} + s_{i0} \qquad (8)$$

where $s_{ij}$ represents the $j^{th}$ bit position of segment $s_i$. For the segment $s_0$, the zero$^{th}$ bit position, which would be a fictional bit position "$B_{-1}$," may be set to 0 to render the response of the controller to segment $s_0$ consistent with Table 1.

Figure 6:
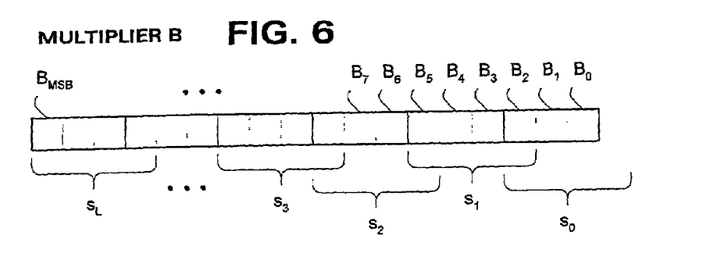
FIG. 6 illustrates a multiplier according to an embodiment of the present invention.

It may be observed from FIG. 6 that a multiplier B will not fill all segments completely unless the length of the multiplier is a multiple of 3. In an embodiment, when the length of the multiplier is not a multiple of 3, it may be sign extended in sufficient length to fill an otherwise unused portion of the last segment. This typically involves copying the sign bit, the most significant bit $B_{MSB}$, to fill fictional bit positions beyond the most significant bit.

The IPG embodiments described above may be applied to multiplier circuits of a variety of architectures. In each application, use of an IPG permits the multiplier circuit to achieve faster operation essentially by permitting additions to occur once every three bit positions rather than once per bit position as is conventional.

Figure 7:
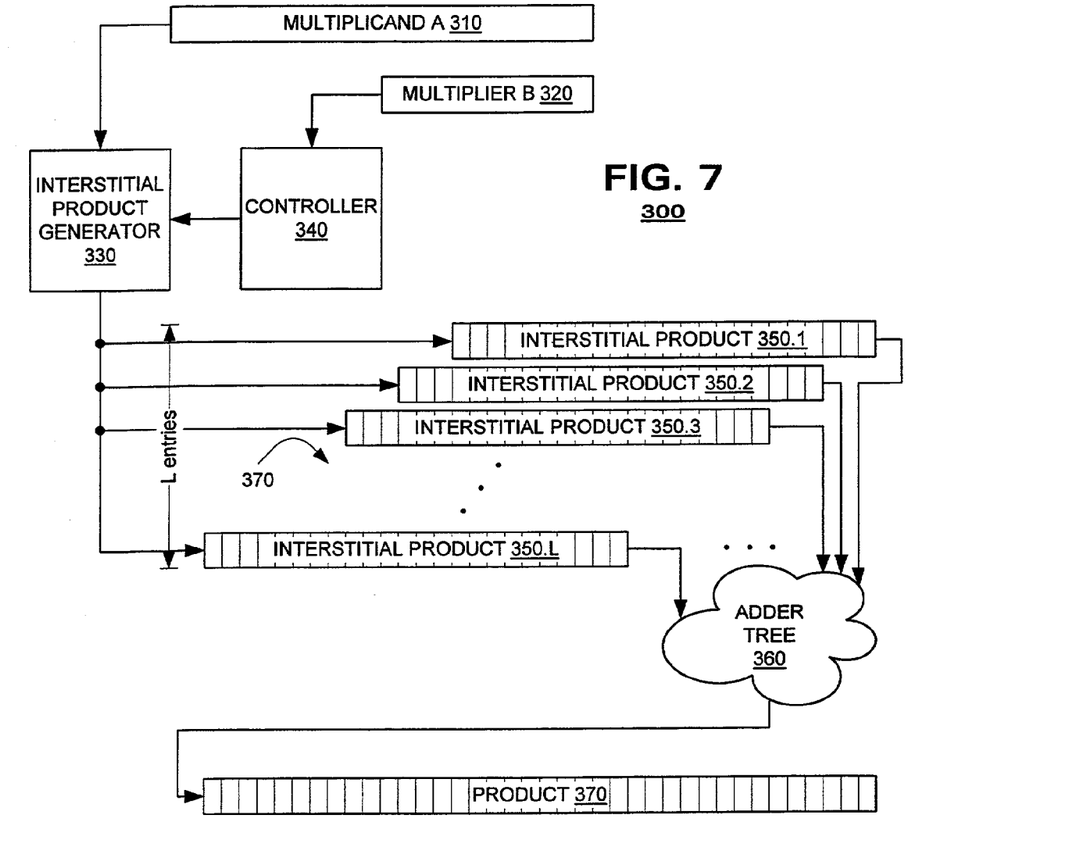
FIG. 7 illustrates a multiplier circuit according to an embodiment of the present invention.

FIG. 7 is a diagram of an application of an IPG in a combinatorial multiplier 300 according to an embodiment of the present invention. The combinatorial multiplier 300 may include first and second registers 310 for storage of a multiplicand A and a multiplier B respectively. It may include an IPG 330, a controller 340, a plurality of interstitial product registers 350.1–350.L, an adder tree 360 a product register 370.

During operation, the IPG 330 may be initialized to create the values A, $\overline{A}$, 3A and $\overline{3A}$ and shifted values of A and $\overline{A}$. The controller 340 may parse the multiplier B into segments and, responsive to the bit pattern in each segment, cause the IPG 330 to load one of the values into a corresponding interstitial product (say, 350.1). In an embodiment, the number of interstitial products 350.1–350.L may be based upon the number of segments supported by the multiplier B. Thus, the number of interstitial products 350.1–350.L may be tied to the length of the multiplier register 320.

Once values are loaded in each of the interstitial product registers 350.1–350.L, the combinatorial multiplier 300 may cause a final product to be stored in the product register 370 by summing across all the interstitial product registers 350.1–350.L. An adder tree 360 accepts the interstitial product values from each product registers and sums them in a manner that is cognizant of the respective bit offsets among the interstitial product registers. Adder trees are well known per se and may be modified for this purpose.

In an embodiment for a multiplicand A of length m and a multiplier B of length n, the product register 370 may have a length n+m just as in the traditional combinatorial multiplier. Interstitial product registers 350.1–350.L may have a length m+2 whereas in traditional combinatorial multipliers, they would have a length m.

Traditional combinatorial multipliers include one interstitial product register for each bit position of a multiplier B. In the foregoing embodiment, there need be only one interstitial product register (say, 350.1) for every three bit positions of the multiplier B. Thus, because the combinatorial multiplier 300 of the foregoing embodiments include approximately one-third the number of interstitial registers than conventional counterparts, the adder tree include one-third the number of adders to compute the final summation. Products are expected to be generated faster in the present embodiment because the final addition is carried out across fewer interstitial values and, therefore, is available more quickly. This embodiment, therefore, yields higher throughput with less logic.

Figure 8:
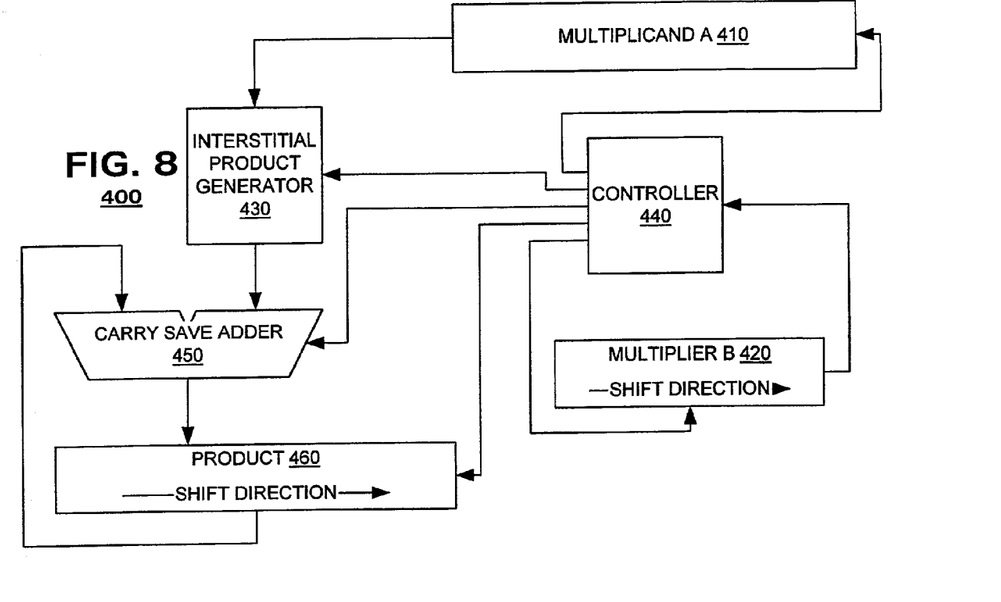
FIG. 8 illustrates a multiplier circuit according to another embodiment of the present invention.

FIG. 8 is a block diagram of an application of an IPG integrated with a shift-add multiplier circuit 400 according to an embodiment of the present invention. The multiplier circuit 400 may include a pair of registers 410, 420 for storage of the multiplicand A and the multiplier B. The shift-add multiplier circuit 400 also may include an IPG 430, a controller, a carry save adder 450 and a product register 460.

During operation, the multiplier circuit 400 may be initialized. In this embodiment, the product register 460 may be cleared to zero and the interstitial product generator 430 may be initialized with the value of the multiplicand A. Thereafter, during operation, the controller 440 may shift each segment out of the multiplier register 420 and, responsive to the new segment, may cause a selected value to be output from the IPG 430 to a first input of the carry save adder 450. The most significant bits from the product register 460 may be shifted 3 places and input to a second input of the carry save adder. The carry save adder 450 may add the values presented on each of its two inputs together and write the value back to the product register 460. This process may repeat in an incremental fashion for as many segments as are supported by the multiplier B.

As in the embodiment of FIG. 4, the embodiment of FIG. 8 provides for improved performance over traditional shift-add multiplier circuits. The traditional circuits perform an addition for each bit position of a multiplier B. By contrast, the embodiment shown in FIG. 8, provides an addition only once for every three bit positions of the multiplier B. Again, a fewer number of additions permit the shift-add multiplier of FIG. 8 to generate multiplication products in a shorter amount of time than would be available from traditional circuits.

Figure 9:
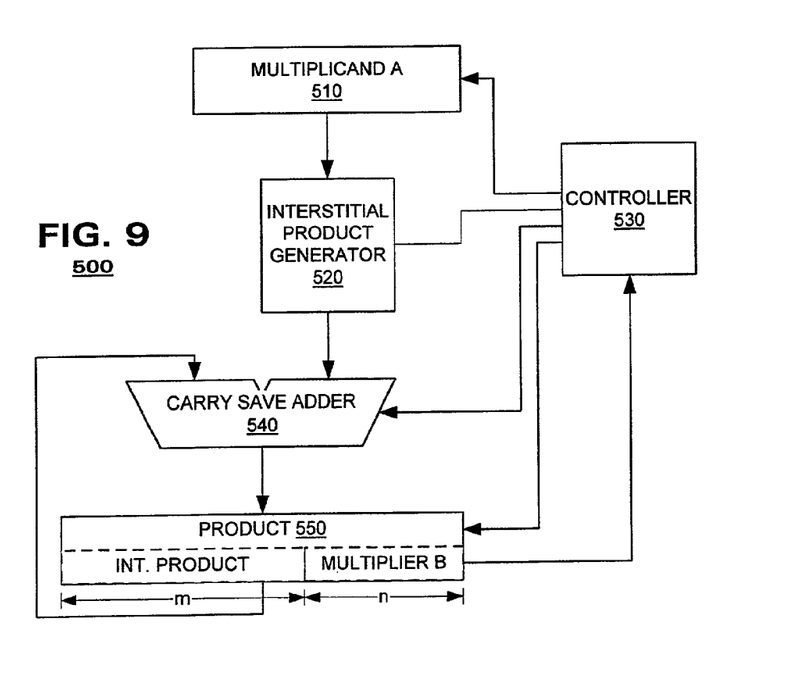
FIG. 9 illustrates a multiplier circuit according to an embodiment of the present invention.

In another embodiment, a multiplier circuit may omit use of a multiplier register (such as the multiplier 420 of FIG. 8). FIG. 9 illustrates a multiplier 500 populated by a multiplicand register 510, an IPG 520, a controller 530, a carry save adder 540 and a product register 550. A multiplicand value (A) may be input to the IPG 520 as an initialization step. Additionally, a multiplier value (B) may be loaded into the least significant bit positions of the product register 550.

On each clock cycle, the contents of the product register 550 may be downshifted by three bit positions. When the least significant bits of the product register are shifted out of the product register, they may be input to the controller 530 as a new segment. In response to these three bits (and one bit from the shift of a prior clock cycle), the controller 530 may cause the IPG 520 to generate an output as shown above in Table 1. The IPG output may be provided to a first input of the carry save adder 540. The downshifted value from the product register 550 may be provided to a second input of the carry save adder 540. The carry save adder 540 may add the two input values and store them to the product register in the most significant bit positions. Again, this embodiment provides improved performance over other shift-add multipliers that operate a single bit shift at a time. As compared to the embodiment of FIG. 4, this embodiment also provides better register utilization because the register 420 (FIG. 4) may be omitted.

Figures 10, 11:
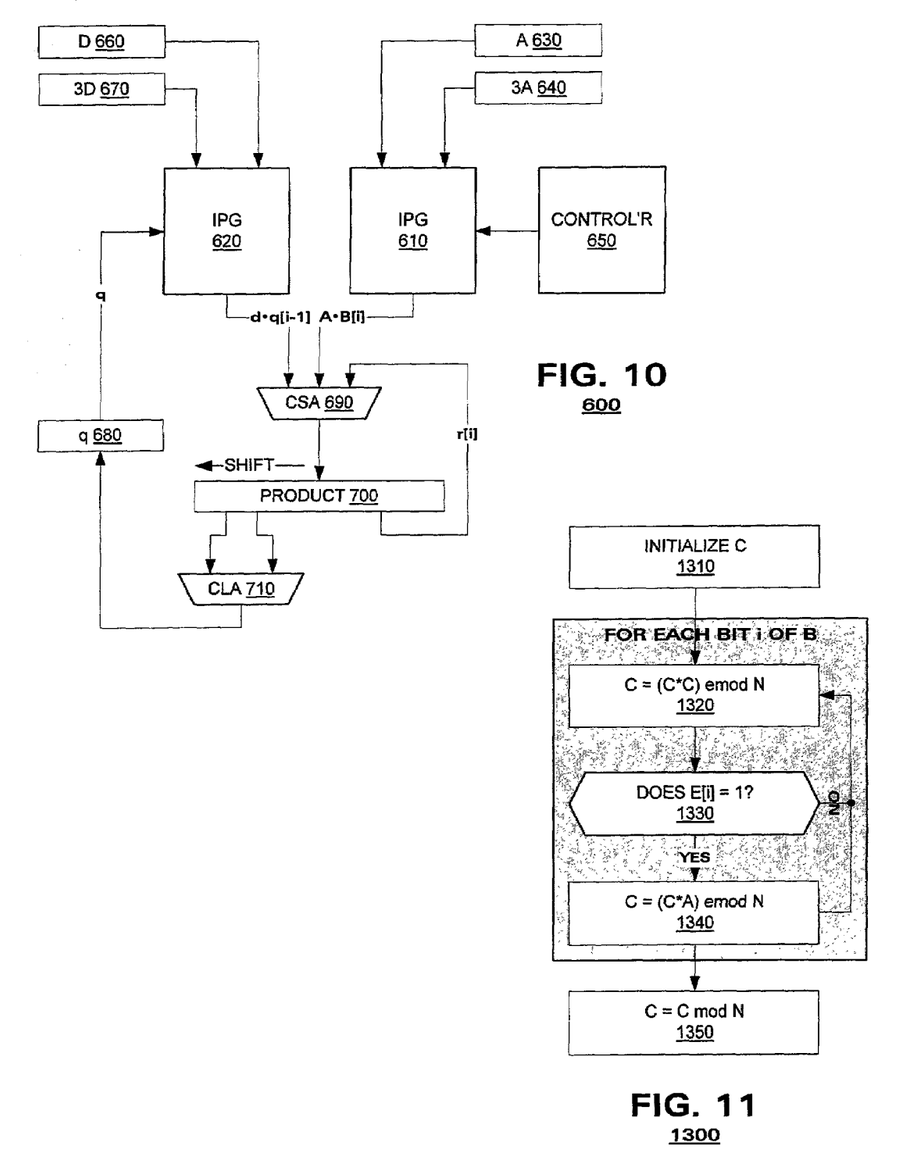
FIG. 10 illustrates a multiplier circuit according to another embodiment of the present invention.
FIG. 11 illustrates another method according to an embodiment of the present invention.

FIG. 10 illustrates a multiplication circuit 600 according to another embodiment of the present invention. This embodiment may be used to evaluate equation 7 above. In this embodiment, the multiplier 600 may include a pair of IPGs 610, 620. A first IPG 610 may evaluate the A·B[i] term of equation 7, the second IPG 620 may evaluate the d·q[i−1] term. The first IPG 610 may accept as inputs values of A and 3A from respective registers 630, 640. The first IPG 610 may be controlled by a controller 650 which in turn may be controlled by the respective word of B (input not shown).

The second IPG 620 may accept values of d and 3d from respective sources 660, 670. The second IPG 620 may be controlled by a q value 680.

The multiplication circuit 600 may include a carry save adder 690 that accepts, as inputs, outputs from the two IPGs 610, 620 and a result value from a product register 700. An output of the carry save adder 690 may be input to the product register 700. The product register 700 may be provided as a shift register to implement the shifts described in connection with FIG. 3. A span of bits from the least significant bit positions may output to the carry save adder 690 as the r[i] value.

As is known, a carry save adder generates a result in the so-called "redundant form." Carry save adders are faster than other types of adders because they generate results of addition operations without performing a traditional carry propagation (a time consuming operation). Instead, the addition results are stored using multiple bits per "bit position." Multiple additions can be performed in redundant form. After a final addition, a single carry propagation may be performed to obtain a result in non-redundant form.

According to an embodiment, a portion of the product register 700 corresponding to the quotient q may be input to a second adder 710 such as a carry lookahead adder. The second adder 710 may generate a non-redundant result which may be fed back to the second IPG 610 as the q value.

The foregoing embodiments have been presented in connection with an evaluation of a (A·B) emod n operation. If done in connection with an (A·B) mod n operation, the methods illustrated in FIGS. 1–3 may be followed by a single mod operation to complete the evaluation. These embodiments may be used advantageously, however, for the evaluation of other operations, such as an $A^B$ emod n operation, in which case the mod n operation may be deferred.

Evaluation of $A^B$ emod n

Embodiments of the emod operation are described below in the context of an $A^B$ mod n calculation. Resolution of the calculation may proceed as a nested loop process, constituting an outer loop and an inner loop.

The outer loop may scan the bits of the exponent and to control the multiplications. Each pass of the outer loop may include squaring operation:

$$c = (c \cdot c) \operatorname{emod} n, \tag{9}$$

and, depending on the current bit in the exponent, an additional multiplication:

$$c = (c \cdot a) \operatorname{emod} n, \tag{10}$$

This embodiment is illustrated in FIG. 11.

FIG. 11 illustrates another method 1300 according to an embodiment of the present invention. According to the method 1200, a dummy variable c may be initialized to be zero (box 1210). Thereafter, the method iteratively considers each bit i of the exponent B. During each iteration, the method may evaluate equation 9 using an inner loop (box 1320). Thereafter, the method 1300 may determine whether the $i^{th}$ bit of the exponent B (B[i]) is 1. If so, the method 1300 may evaluate equation 10 using an inner loop (box 1330). When the operation of box 1330 concludes or if the ith bit was not a 1, the operation may advance to a next successive iteration.

Upon conclusion of the last iteration, the method 1300 may invoke a traditional mod operation upon the value c (box 1340). This result obtains the result of $A^B$ mod n.

The inner loop of the operation may be performed using any of the methods described hereinabove with respect to FIGS. 1–3. During processing of the inner loop, both cases may be implemented using the same hardware. There need be no special handling to accommodate the squaring case. Typically the operands c and mn are of the same size and a is somewhat smaller.

Determining d and m.

To determine the parameters d and m, the number of significant bits in n, size(n), may be determined so that:

$$2^{size(n)-1} \leq n < 2^{size(n)}. \tag{11}$$

Also, k may be defined as:

$$k = size(n) + \text{precision} \tag{12}$$

for some desired precision value. Further, mn may be defined to be m·n, an integer multiple of n, so that:

$$d = 2^k - mn < n \tag{13}$$

The parameter mn, when viewed in binary format, has a number of leading 1s equaling or exceeding the precision value.

To find m and d from n and 2k, note that:

$$mn = m \cdot n = \text{int}\left(\frac{2^k}{n}\right) \cdot n \tag{14}$$

where int(x) finds the largest integer of some value x. To find m, one may use the Newton method:

$$u_{i+1}=(u_i(2^{k+1}-u_i \cdot n))/2^k. \tag{15}$$

Equation 15 has a property that:

$$u_i \Rightarrow (2^k/n) \text{ as } i \Rightarrow \infty. \tag{16}$$

As it is desirable to find only the integer part of $(2^k/n)$, this iteration converges quite fast. To keep the number of bits in $u_i$ to a minimum, it is possible also to take the integer part after each iteration and throw away the fractional part:

$$u_{i+1}=(u_i(2^{k+1}-u_i \cdot n))/2^k \tag{17}$$

This implementation at times can lead to a problem where the iteration stalls before reaching the correct number. Modifying the final iteration slightly however cures the problem.

$$u_{Final}=((u_{Final-1}+1) \cdot (2^{k+1}-u_{Final-1} \cdot n)-2^k)div2^k$$

In another embodiment, the calculation of $(2^{k+1}-u_i \cdot n)$ where $(u_i \cdot n) < 2^{k+1}$ can be done simply by setting the leading ones of the negative number $-(u_i \cdot n)$ to zero from position (k+1) and up. That is equivalent to keeping the bits from position k down to 0.

In one embodiment, the calculation of m and d may be implemented in software according to the following pseudocode.

```
u := 1.5 · 2 ^ (precision-1)
for i := 1 to (final_iteration-1) do
    x := -n·u
    x := selectbits (k downto 0, x)        // 2 ^ (k+1) – n·u
    x := u·x
    u := selectbits (max_bits downto k, x) // (. . .) div 2 ^ k
x := -n·u
x := selectbits (k downto 0, x)
u := u + 1
x := u·x
x := x - 2 ^ k
m := selectbits (max_bits downto k, x)    // (. . .) div 2 ^ k
x := -n·m
d := selectbits ((k-1) downto 0, x)       // 2 ^ k – m·n
```

An Algorithm for Calculating $m=(2^k \text{ div } n)$ and $d=(2^k-mn)$ where the function selectbits(max downto min, c) returns the bits in c from and including positions max and down to min.

The embodiments presented hereinabove provide a computational substitute for a mod operation, labeled "emod," that incurs much less computational expense at the cost of lost precision. It is useful when performing a mod operation in connection with multiplications or exponential operations. By applying an emod operation to interstitial products, the length operands may be maintained to be within some predetermined length window. When a final product is obtained, a traditional mod operation may be applied to obtain a final result. This scheme obtains a final result with much less processing than would be possible using only the mod operation.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method of performing a modulus operation upon an operand that is represented by mathematical function to be performed iteratively, the modulus taken with respect to a value n, comprising:

upon conclusion of each of a plurality of interstitial iterations and in response to a key negotiation request in a computing device, determining, by said computing device, a modulus of a result thereof using a phantom modulus that is a multiple of n, the phantom modulus approximating $2^k$ for some arbitrary k, upon conclusion of a final iteration, determining, by said computing device, a modulus of a result thereof using a true modulus n; and storing the modulus of a result thereof using a true modulus n memory.

2. The method of claim 1, wherein the first modulus operation is performed as a series of subtractions.

3. A method of resolving an (A·B) mod n operation, comprising, iteratively, for each of several words of B and in response to a key negotiation request in a computing device:

shifting, by a computing device, a value c by a word length, adding, by computing device, to the shifted value c, a value A·B[i], where B[i] is the ith word of B, performing, by said computing device, an emod operation of a result of the addition, using a phantom modulus mn that is a multiple of n, following a last iteration, performing, by said computing device, a modulus operation on the result of the addition from the last iteration; and storing the result of the modulus operation in memory.

4. The method of claim 3, wherein the method is performed by a processor and the word length is determined by a register width of the processor.

5. The method of claim 3, wherein the value A·B[i] is obtained form a multiplication method, comprising:

initially, generating values 0, A<<1, 3A, A<<2 and their complements, iteratively, for each three-bit segment of a B, adding to an interstitial product one of the initial values, wherein the addition occurs at a bit position of the interstitial product determined by a position of the segment, wherein the value of the interstitial product following final iteration is taken as the A·B[I] value.

6. The method of claim 5, wherein the multiplication is accomplished in an unsigned combinatorial multiplier.

7. The method of claim 5, wherein the multiplication is accomplished in a shift-add multiplier.

8. The method of claim 5, wherein the method is performed in an integrated circuit and each iteration occurs once per cycle of a driving clock.

9. The method of claim 5, wherein the initial value is selected as determined by Table 1 considering the value of the three bit segment and a value of a bit position adjacent to the three bit segment.

10. The method of claim 5, wherein the initial value is selected according to a control value $C_i$ governed by:

$$C_i = 4s_{i3} + 2s_{i2} + s_{i1} + s_{i0}$$

wherein $S_{i3}$, $S_{i2}$ and $S_{i1}$ are values from within the three bit segment and $S_{i0}$ is a value of a bit position adjacent to the three bit segment.

11. A method for resolving an (A·B) mod n, operation comprising:
 iteratively, for each of several words of B and in response to a key negotiation request in a computing device:
  generating, by said computing device, a quotient q from a higher order portion of an earlier valuation of c,
  generating, by said computing device, a remainder r from a lower order portion of the value c,
  revaluing, by said computing device, c to be A·B[i]+r+d·q, where d is a precision value of a phantom modulus, where B[I] is the ith word of B,
 following a last iteration, performing, by said computing device, a modulus operation on the result of the revaluing from the last iteration; and
 storing the result of the modulus operation in memory.

12. The method of claim 11, wherein the method is performed by a processor and the word length is determined by a register width of the processor.

13. The method of claim 11, wherein the value A·B[i] is obtained from a multiplication method, comprising:
 initially, generating values 0, A<<1, 3A, A<<2 and their complements,
 iteratively, for each three-bit segment of a B, adding to an interstitial product one of the initial values, wherein the addition occurs at a bit position of the interstitial product determined by a position of the segment,
 wherein the value of the interstitial product following final iteration is taken as the A·B[i] value.

14. The method of claim 13, wherein the multiplication is accomplished in an unsigned combinatorial multiplier.

15. The method of claim 13, wherein the multiplication is accomplished in a shift-add multiplier.

16. The method of claim 13, wherein the method is performed in an integrated circuit and each iteration occurs once per cycle of a driving clock.

17. The method of claim 13, wherein the initial value is selected as determined by Table 1 considering the value of the three bit segment and a value of a bit position adjacent to the three bit segment.

18. The method of claim 13, wherein the initial value is selected according to a control value $c_i$, governed by:

$$C_i = 4s_{i3} + 2s_{i2} + s_{i1} + s_{i0}$$

wherein $S_{i3}$, $S_{i2}$ and $S_{i1}$ are values from within the three bit segment and $S_{i0}$ is a value of a bit position adjacent to the three bit segment.

19. A method of resolving an (A·B) mod n operation, comprising:
 Iteratively, for each of several words of B and in response to a key negotiation request in a computing device:
  Generating, by said computing device, a quotient q[i] from a higher order portion of an earlier valuation of c, where i represents the current iteration,
  Generating, by said computing device, a remainder r[i] from a lower order portion of the value c,
  Shifting, by said computing device, left quotient q[i−1] by word width,
  Revaluing, by said computing device, c to be A·9 B[i]+r[i]+d·q[i−1], where d is a precision value of a phantom modulus, where B[i] is the ith word of B and the revaluing uses the shifted quotient,
 following a last iteration, performing, by said computing device, a modulus operation on the result of the revaluing from the last iteration; and
 storing the result of the modulus operation in memory.

20. The method of claim 19, wherein the method is performed by a processor and the word length is determined by a register width of the processor.

21. A method of resolving an $A^8$ mod n operation, comprising:
 iteratively, for each bit position i of B and in response to a key negotiation request in a computing device:
  Performing, by said computing said computing device, a c=(c·c) emod n operation, and
  if the ith bit position of B is a 1, performing, by said computing device, a c=(c·A) emod n operation; and
 following a last iteration, performing, by said computing device, A mod N operation of c obtained from the last operation,
 wherein the emod n operation calculates a modulus result from a phantom modulus mn, wherein mn is an integer multiple of n; and
 storing the modulus result in memory.

22. The method of claim 21, wherein the method is performed by a processor and the word length is determined by a register width of the processor.

23. The method of claim 21, wherein the value A·B[i] is obtained from a multiplication method, comprising:
 initially, generating values 0, A<<1, 3A, A<<2 and their complements,
 iteratively, for reach three-bit segment of a B, adding to an interstitial product one of the initial values, wherein the addition occurs at a bit position of the interstitial product determined by a position of the segment,
 wherein the value of the interstitial product following final iteration is taken as the A·B[i] value.

24. The method of claim 23, wherein the multiplication is accomplished in an unsigned combinatorial multiplier.

25. The method of claim 23, wherein the multiplication is accomplished in a shift-add multiplier.

26. The method of claim 23, wherein the method is performed in an integrated circuit and each iteration occurs once per cycle of a driving clock.

27. The method of claim 23, wherein the initial value is selected as determined by Table 1 considering the value of the three bit segment and a value of a bit position adjacent to the three bit segment.

28. The method of claim 23, wherein the initial value is selected according to a control value $c_i$, governed by:

$$C_i 32\ 4s_{i3} + 2s_{i2} + s_{i1} + s_{i0}$$

wherein $S_{i3}$, $S_{i2}$, and $S_{i1}$ are values from within the three bit segment and $S_{i0}$ is a value of a bit position adjacent to the three bit segment.

* * * * *